UNITED STATES PATENT OFFICE.

OTTOKAR SERPEK, OF PARIS, FRANCE, ASSIGNOR TO SOCIETE GENERALE DES NITRURES, OF PARIS, FRANCE.

MANUFACTURE OF NITROGEN COMPOUNDS OF SILICON AND ALUMINIUM.

1,060,640. Specification of Letters Patent. Patented May 6, 1913.

No Drawing. Application filed November 9, 1911. Serial No. 659,413.

*To all whom it may concern:*

Be it known that I, OTTOKAR SERPEK, of 12 Rue Roquepine, Paris, France, chemical engineer, have invented certain new and useful Improvements in the Manufacture of Nitrogen Compounds of Silicon and Aluminium, of which the following is a full, clear, and exact description.

This invention relates to the manufacture of nitrogen compounds of silicon and aluminium from bauxite, kaolin, clays and in general any bodies containing silica and alumina in mixture or combination.

The invention consists in heating these bodies mixed with the requisite quantity of carbon in a current of nitrogen containing no oxygen (free or combined) first to a temperature not exceeding that at which there is danger of volatilization of the silica and formation of silicon carbid (about 1300 to 1500° C.) for a sufficient time to cause almost the whole of the silica to be transformed into nitrid, then in raising this temperature up to the point at which the formation of aluminium nitrid is effected rapidly (about 1600 to 1800° C.) as indicated in the specification of U. S. Patent No. 987,408. Experience has shown that the silicon nitrid formed during the first stage of the operation will not be decomposed at the higher temperatures employed in the second stage. On the other hand, if higher temperatures were employed in the first stage of the process, part of the silica would be volatilized, and also silicon carbid would be formed, which is not in itself convertible into nitrid, and particles of silica not transformed would remain and interfere with the reaction. In the second stage of the heating it suffices to operate in a current of nitrogen containing no oxygen either free or combined as carbon dioxid, experience having shown that at these high temperatures the presence of carbon monoxid does not affect the reaction. Consequently in this stage there may be used producer gas free from oxygen and freed from carbon dioxid.

Having thus described my invention, what I claim as such and desire to secure by Letters Patent is:—

1. A process for the manufacture of nitrogen compounds of silicon and aluminium from bodies containing silica and alumina in combination, consisting in subjecting the bodies with carbon to the action of a current of nitrogen, first at a temperature below 1500° to 1600° C. to form silicon nitrid and then at a higher temperature to form aluminum nitrid.

2. A process for the manufacture of nitrogen compounds of silicon and aluminium, comprising the mixture with carbon of a body containing silica and alumina, heating said mixture for a suitable length of time in a current of nitrogen free from oxygen at a temperature lower than the volatilization point of silica, and then heating said mixture in a current of nitrogen at a temperature sufficient for the formation of aluminium nitrid.

3. A process for the manufacture of nitrogen compounds of silicon and aluminium, comprising the mixture with carbon of a body containing silica and alumina, heating said mixture in a current of nitrogen free from oxygen at a temperature lower than the volatilization-point of silica for a sufficient time to cause transformation of the silica into nitrid, and then continuing the treatment at a higher temperature to the point of rapid formation of aluminium nitrid.

4. A process for the manufacture of nitrogen compounds of silicon and aluminium, comprising the mixture with carbon of a body containing silica and alumina, heating said mixture for a sufficient time in a current of nitrogen free from oxygen at a temperature not exceeding 1300 to 1500° C., and then heating said mixture in a current of nitrogen at a temperature of about 1600 to 1800° C.

In testimony whereof I have signed my name to this specification, in the presence of two subscribing witnesses.

OTTOKAR SERPEK.

Witnesses:
 EUGÈNE LEGRIS,
 LÉON PEILLET.

Copies of this patent may be obtained for five cents each, by addressing the "Commissioner of Patents, Washington, D. C."